United States Patent [19]

Jang

[11] Patent Number: 5,374,176
[45] Date of Patent: Dec. 20, 1994

[54] ELECTRIC CIRCUIT WIRE CLAMPING DEVICE OF INJECTION MOLDING MACHINE

[76] Inventor: Chen H. Jang, 11, Lane 147, Da-Jyh R., Kao Hsiung, China

[21] Appl. No.: 141,065

[22] Filed: Oct. 26, 1993

[51] Int. Cl.⁵ ............................................. B29C 45/17
[52] U.S. Cl. ........................................ 425/116; 249/93; 249/95; 264/275; 425/117; 425/122; 425/126.1; 425/186; 425/192 R
[58] Field of Search ............... 425/111, 122, 126.1, 425/186, 192 R, 190, 113, 114, 116, 117, 110; 264/275, 271.1, 272.11; 249/93, 95

[56] References Cited

U.S. PATENT DOCUMENTS

| | | | |
|---|---|---|---|
| 4,025,600 | 5/1977 | Parr | 264/275 |
| 4,701,117 | 10/1987 | Takaoka et al. | 425/116 |
| 4,734,241 | 3/1988 | Gerow | 425/116 |
| 4,786,454 | 11/1988 | Oddenino | 425/116 |
| 5,182,032 | 1/1993 | Dickie et al. | 249/93 |

Primary Examiner—Khanh Nguyen
Attorney, Agent, or Firm—Bacon & Thomas

[57] ABSTRACT

An electric circuit wire clamping device of the injection molding machine includes mainly a clamping block, a clamping block cover plate, a cylinder and two push rods. The clamping block Is provided with a bevel slot. The clamping block cover plate is provided with a bevel holding block for holding securely the conducting wire of an electric circuit intended to be housed. The cylinder serves to actuate the two push rods so as to cause the bevel holdeng block of the clamping block cover plate to hold firmly the conducting wire of the electric circuit at the time when the injection molding process of housing the electric circuit is under way.

1 Claim, 5 Drawing Sheets

ELECTRIC CIRCUIT WIRE CLAMPING DEVICE OF INJECTION MOLDING MACHINE

BACKGROUND OF THE INVENTION

The present invention relates generally to an injection molding machine, and more particularly to an electric circuit wire clamping device of the injection molding machine. The process of housing an electric circuit is generally done by injection molding. However: the conducting wire of the electric circuit is not housed in the casing and is therefore exposed intentionally. Therefore, the conducting wire must be guided and held manually to a safety area of the injection molding machine until such time when the process of housing the electric circuit is completed. The process described above is not only inefficient but also potentially hazardous to the safety of a worker holding manually the conducting wire of the electric circuit at the time when the injection molding process is under way.

SUMMARY OF THE INVENTION

It is therefore the primary objective of the present invention to provide an injection molding machine with a device for clamping the conducting wire of an electric circuit during the process in which the electric circuit is housed in a plastic casing by injection molding. The foregoing objective of the present invention is accomplished by an electric circtit wire clamping device which comprises mainly a clamping block, a clamping block cover plate, a fastening block, a cylinder and two push rods. The clamping block is provided with a bevel slot. The clamping block cover plate is provided with a bevel holding block for holding securely the conducting wire of an electric circuit intended to be housed. The cylinder serves to actuate the two push rods so as to cause the bevel holding block of the clamping block cover plate to hold firmly the conducting wire of the electric circuit at the time when the injection molding process of housing the electric circuit is under way. The foregoing objective, features and functions of the present invention can be more readily understood upon a thoughtful deliberation of the following detailed description of the present invention in conjunction with the accompanying drawings.

DETAILED DESCRIPTION OF THE INVENTION

Figure 1:
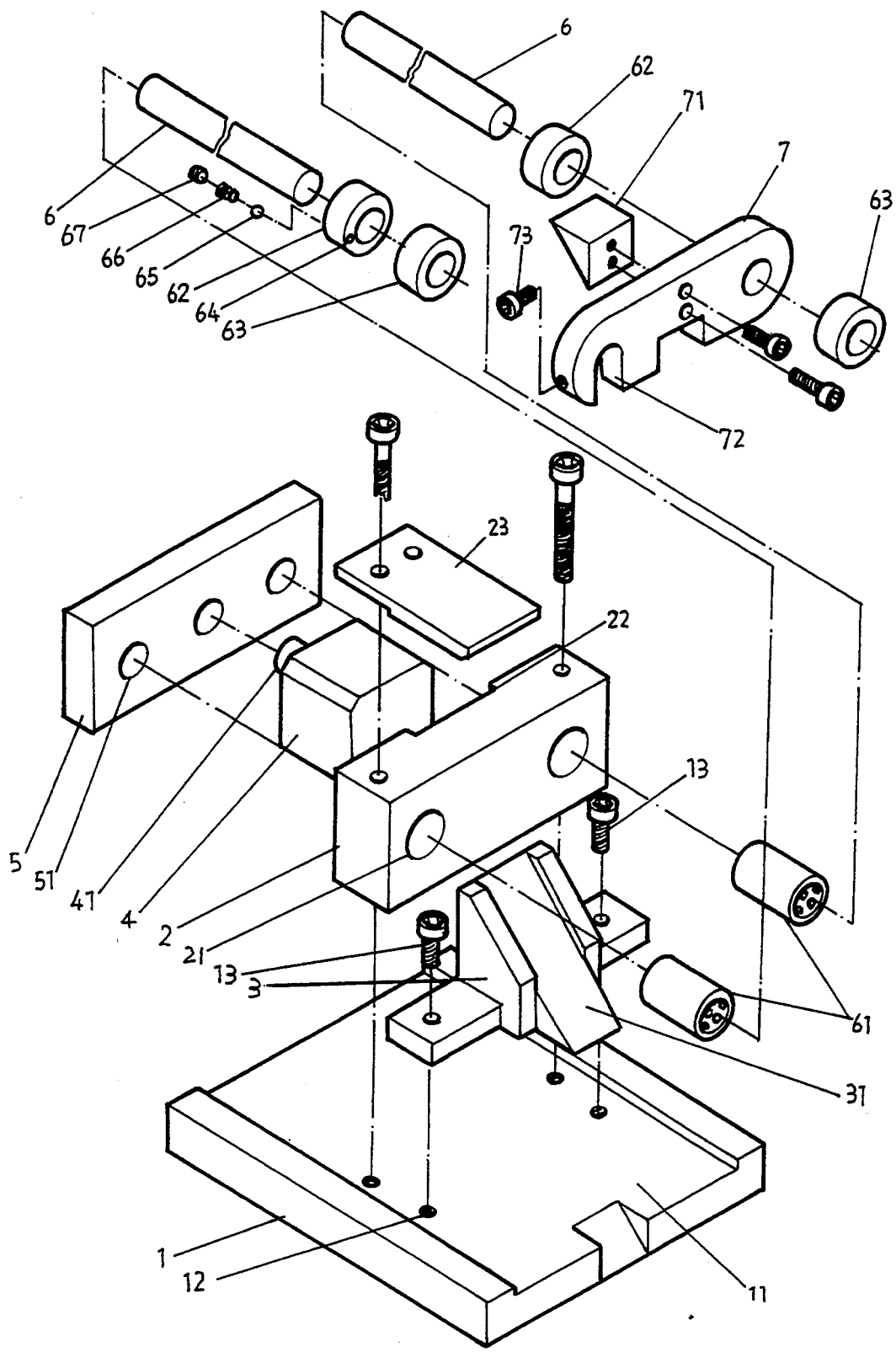
FIG. 1 shows an exploded view of the present invention.
Figure 2:
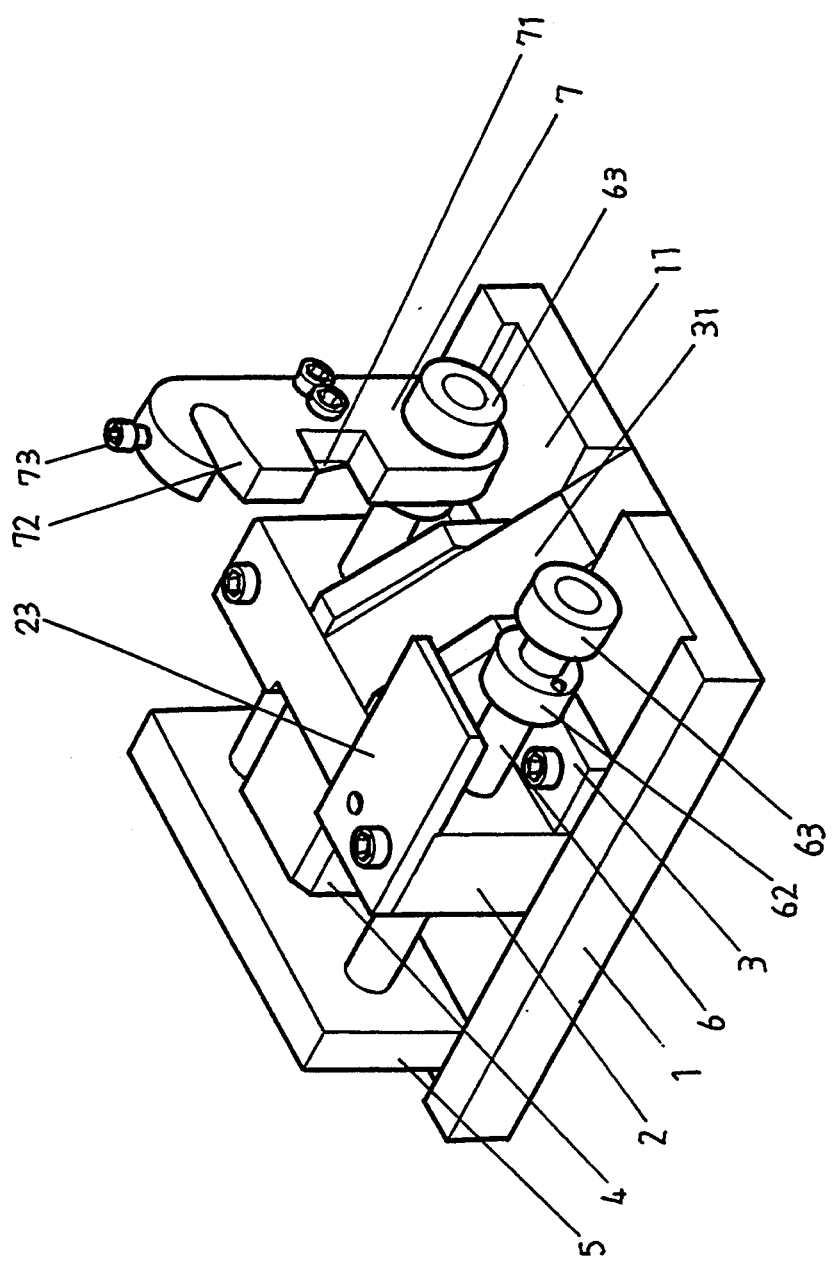
FIG. 2 shows a perspective view of the present invention in combination.
Figure 3:
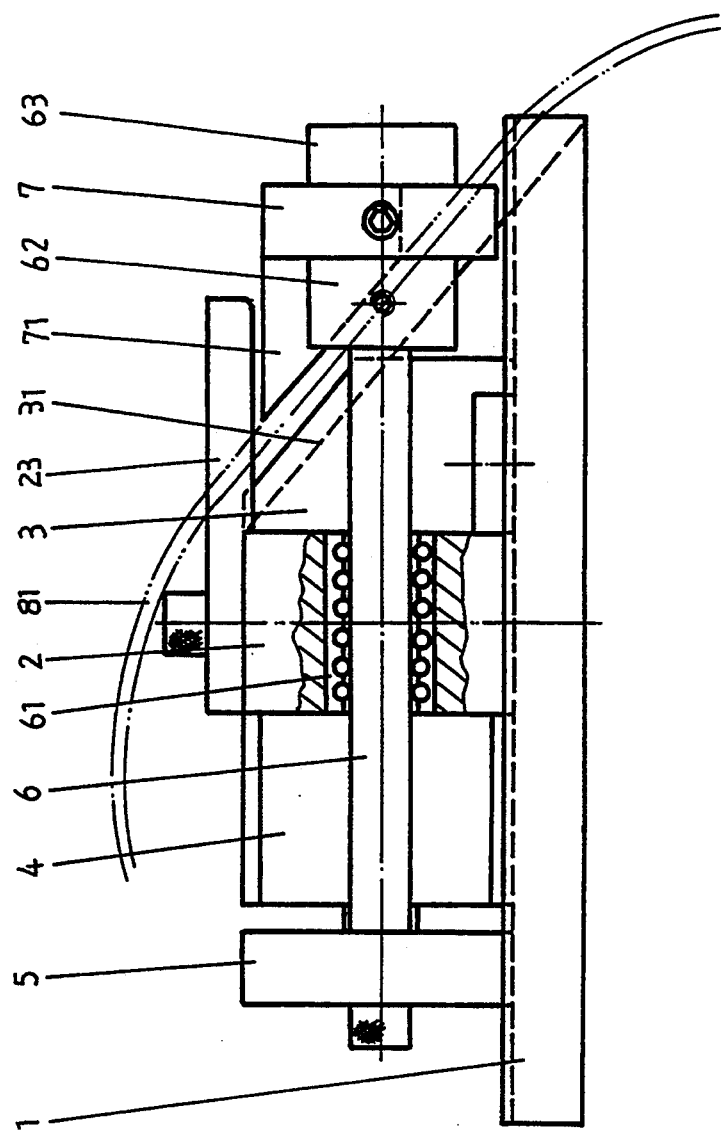
FIG. 3 is a schematic view showing the present invention at work before the clamping of the conducting wire of an electric circuit has taken place.
Figure 4:
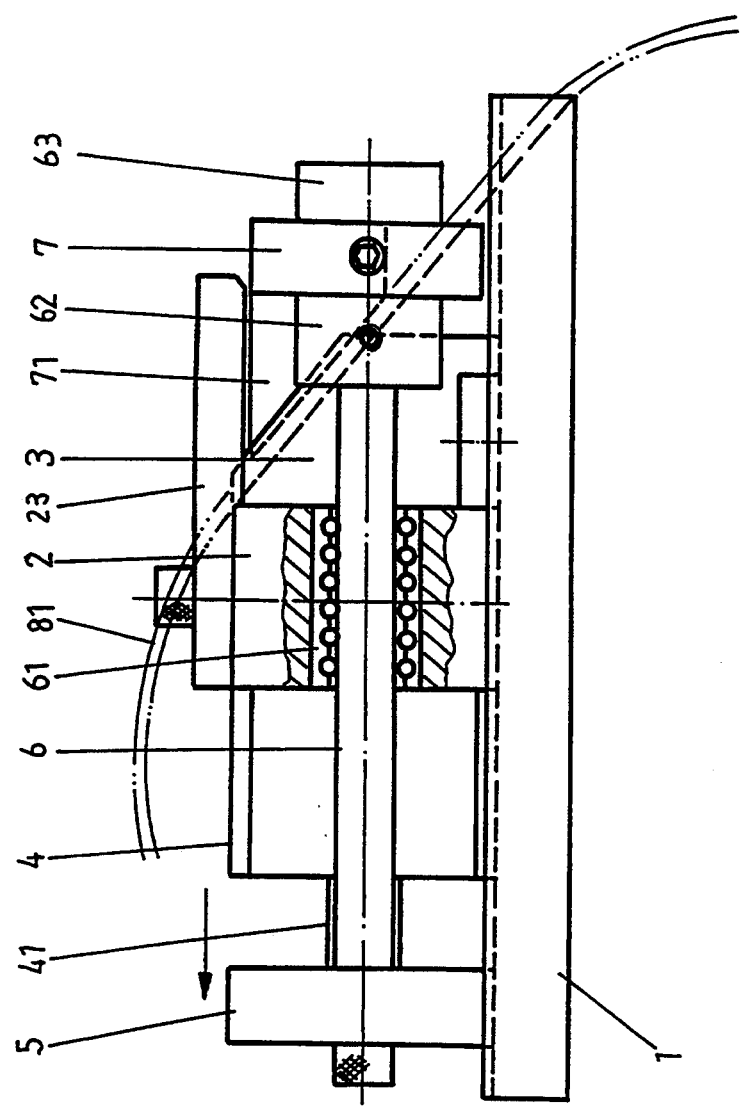
FIG. 4 is a schematic view showing the present invention at work after the clamping of the conducting wire of an electric circuit has taken place.
Figure 5:
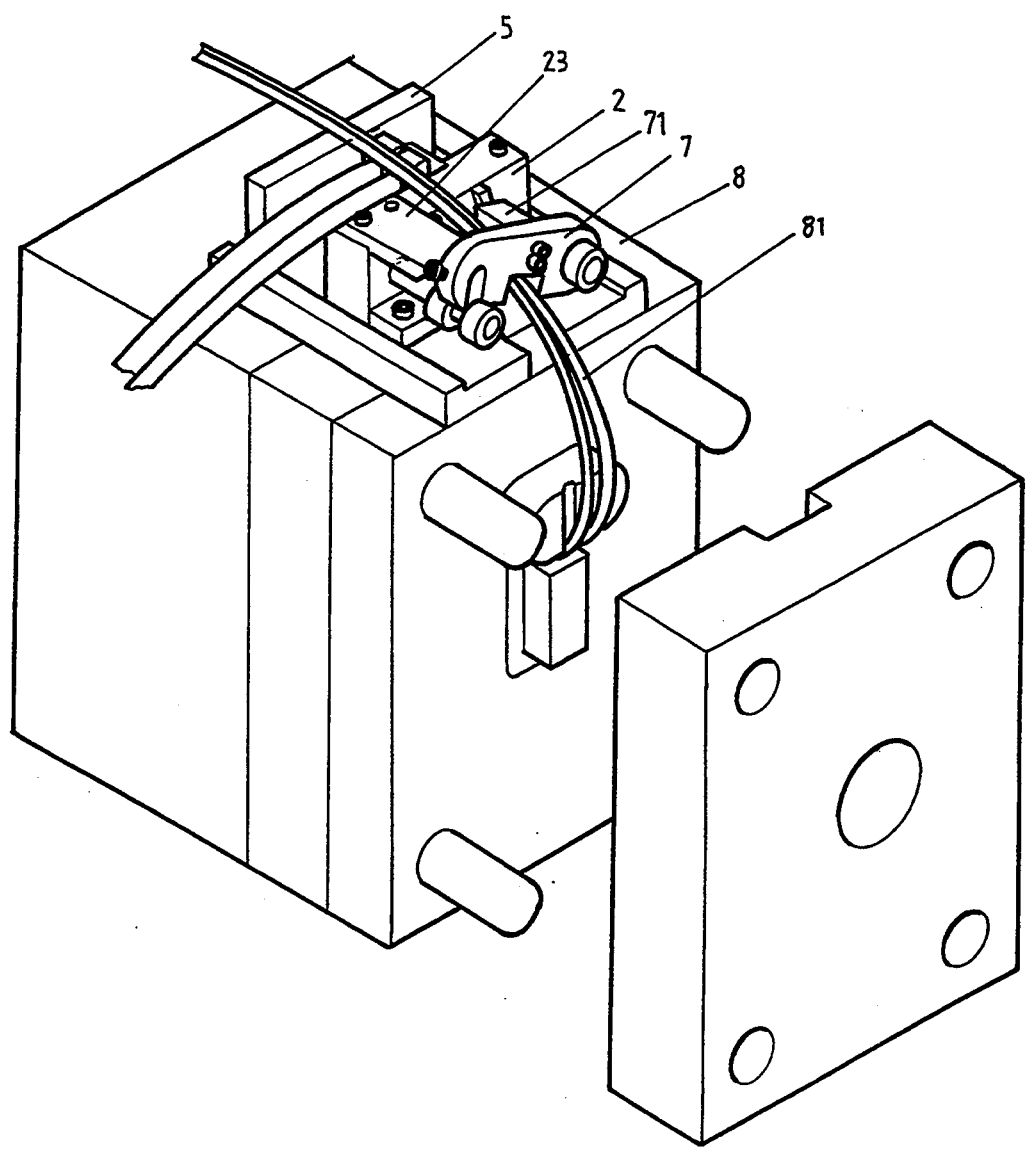
FIG. 5 shows a schematic view of an embodiment of the present invention.

As shown in FIGS. 1 and 2, the device of the present invention comprises a base 1 having a recessed sliding slot 11 provided with two sets of threaded holes 12 engageable with tow sets of bolts 13. A fastening block 2 and a clamping block 3 are secured respectively to the sliding slot 11 of the base 1 by means of the two sets of the threaded holes 12 and the two sets of the bolts 13. The fastening block 2 is provided in both ends thereof with two shaft bearing holes 21 and in the outer side thereof with a fastening slot 22 in which a cyinder 4 is mounted. The cylinder has a push rod 41 capable of cooperating with a slide block 5 parallel to the fastening block 2. The slide block 5 is provided with two fastening holes 51 corresponding in location to the two shaft bearing holes 21 of the fastening block 2. Two push rods 6 are fitted respectively into the shaft bearing holes 21 of the fastening block 2 and the fastening holes 51 of the slide block 5. Each of the two push rods 6 is provided with a linear shaft bearing 61 fitted thereover. The linear shaft bearing 61 is so dimensioned as to fit securely into the shaft bearing hole 21 The two push rods 6 are further provided respectively with retaining blocks 62 and 63 located on the side of the fastening block facing the slide block 5, Located between the two retaining blocks 62 and 63 of the two push rods 6 is a clamping block cover plate 7, which is provided with a bevel holding block 71 fastened thereto and with an opening 72. The retaining blocd 62, which is located on the corresponding side with the opening 72 of the clamping block cover plate 7, is provided with a recess 64 in which a steel ball 65, a spring 66 and a seal bar 67 are disposed in that order. The clamping block 3 is provided centrally with a bevel slot 31 having an appropriate depth and an appropriate inclination. The wording of the present invention is illustrated in FIGS. 3, 4 and 5 and is described hereinafter, In operation, the base 1 of the present invention is mounted on an injection molding machine 8, as shown in FIGS. 5. A conducting wire 81 of an electric circuit intended to be housed with a plastic casing is pulled out to position in the bevel slot 31 of the clamping block 3. The push rod 6 is retained in the opening 72 of the clamping block cover plate 7 by fastening a pull bar 73 of the clamping block cover plate 7. As a result, the conducting wire 81 is held by the bevel holding block 71 of the clamping block cover plate 7. As the injection molding machine 8 is started, the cylinder 4 actuates the slide block 5 so as to cause the push rod 6 to trigger the clamping block cover plate 7 to move horizontally, thereby causing the bevel distance between the bevel holding block 71 and the bevel slot 31 to be shortened. As a result, the conducting wire 81 is held securely at the time when the process of housing the electric circuit by the injection molding machine 8 is in progress. The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. An electric circuit wire clamping device of an injection molding machine comprising a base provided thereon with a fastening block, a clamping block and a slide block, with said fastening block having a cylinder fastened thereto and connected with said slide block, and with said slide block being provided with two push rods connected with a clamping block cover plate; wherein said base is provided therein with a sliding slot having a plurality of threaded holes; wherein said fastening block is fastened to said sliding slot of said base by means of a plurality of bolts engageable with said threaded holes of said sliding slot, said fastening block having two shaft bearing holes dimensioned to fit over linear shaft bearings, said fastening block further having a fastening slot in which said cylinder is mounted; wherein said clamping block is fastened to said sliding slot of said base by means of a plurality of bolts engageable with said threaded holes of said sliding slot and is provided centrally with a bevel slot; wherein said slide block is fastened to a push bar of said cylinder and provided with two fastening holes; wherein one of said two push rods has one end that is secured to one of said fastening holes and another end that is fitted into one of said linear shaft bearings, with said one of said two push rods being provided with two retaining blocks, one of which has a recess in which a steel ball, a spring and a seal bar are disposed; wherein said clamping block cover plate has one end that is fitted between two retaining blocks of another one of said two push rods and another end that is provided with an opening, said clamping block cover plate further having a bevel holding block fastened thereto; and wherein said cylinder actuates said slide block to cause said push rods to trigger said clamping block cover plate to move, thereby resulting in a reduction in a distance between a bevel of said bevel holding block and a bevel of said clamping block.

* * * * *

UNITED STATES PATENT AND TRADEMARK OFFICE
CERTIFICATE OF CORRECTION

PATENT NO. : 5,374,176

DATED : December 20, 1994

INVENTOR(S) : Shin-Jang CHEN

It is certified that error appears in the above-indentified patent and that said Letters Patent is hereby corrected as shown below:

ON THE COVER PAGE:

Please change the inventor's last name to --CHEN--.

Item [76], change the inventor's full name to --Shin-Jang Chen-- and change "China" to --Taiwan, R.O.C.--.

Signed and Sealed this

Twentieth Day of June, 1995

*Attest:*

BRUCE LEHMAN

*Attesting Officer*     *Commissioner of Patents and Trademarks*